US006415768B1

(12) United States Patent
Usui

(10) Patent No.: US 6,415,768 B1
(45) Date of Patent: *Jul. 9, 2002

(54) DIESEL ENGINE FUEL INJECTION PIPE

(75) Inventor: Shoichiro Usui, Sendai (JP)

(73) Assignee: Usui Kokusai Sangyo Kaisha Limited (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/723,601

(22) Filed: Nov. 28, 2000

(30) Foreign Application Priority Data

Dec. 9, 1999 (JP) .......................................... 11-350300

(51) Int. Cl.7 ............................ F02M 55/02; F16L 9/02
(52) U.S. Cl. .......................................... 123/468; 138/44
(58) Field of Search ................................ 123/456, 468, 123/469; 138/44

(56) References Cited

U.S. PATENT DOCUMENTS

| | | | | | |
|---|---|---|---|---|---|
| 4,526,151 | A | * | 7/1985 | Tateishi et al. | 123/468 |
| 4,832,376 | A | | 5/1989 | Sugao | 285/158 |
| 4,893,601 | A | | 1/1990 | Sugao | 123/468 |
| 4,900,180 | A | | 2/1990 | Takikawa | 403/233 |
| 5,120,084 | A | | 6/1992 | Hashimoto | 285/156 |
| 5,143,410 | A | | 9/1992 | Takikawa | 285/197 |
| 5,169,182 | A | | 12/1992 | Hashimoto | 285/332.2 |
| 5,172,939 | A | | 12/1992 | Hashimoto | 285/24 |
| 5,667,255 | A | | 9/1997 | Kato | 285/133.4 |
| 5,752,486 | A | * | 5/1998 | Nakashima et al. | 123/456 X |
| 5,887,910 | A | | 3/1999 | Usui | 285/288.1 |
| 5,903,964 | A | | 5/1999 | Uematsu et al. | 29/456 |
| 5,937,909 | A | * | 8/1999 | Clauss et al. | 138/44 X |
| 5,957,507 | A | | 9/1999 | Asada | 285/189 |
| 5,979,945 | A | | 11/1999 | Hitachi et al. | 285/125.1 |
| 5,992,904 | A | | 11/1999 | Hitachi et al. | 285/332 |
| 6,050,611 | A | | 4/2000 | Asada | 285/133.4 |
| 6,070,618 | A | | 6/2000 | Iwabuchi | 28/143 |
| 6,126,208 | A | | 10/2000 | Asada et al. | 285/133.4 |

FOREIGN PATENT DOCUMENTS

| | | | |
|---|---|---|---|
| JP | 2-80289 | | 6/1990 |
| JP | 3-177693 | | 8/1991 |
| JP | 4-175462 | | 6/1992 |
| JP | 2000-27731 | * | 1/2000 |

* cited by examiner

*Primary Examiner*—Tony M. Argenbright
(74) *Attorney, Agent, or Firm*—Anthony J. Casella; Gerald E. Hespos

(57) ABSTRACT

There is provided a diesel engine fuel injection pipe which is capable of suppressing pressure variations in the fuel injection pipe and effecting stable injection of fuel and which has a connection portion sealed with high stability. A diesel engine fuel injection pipe includes a head having a conical or spherical seat surface, a clamping nut, and an orifice-pipe disposed at an end of the fuel injection pipe or in the interior of the fuel injection pipe near the end thereof, the orifice pipe having an outer diameter smaller than or equal to the diameter of a pipe passage of the diesel engine fuel injection pipe in the interior of the diesel engine fuel injection pipe near at least one end portion thereof.

9 Claims, 13 Drawing Sheets

DIESEL ENGINE FUEL INJECTION PIPE

BACKGROUND OF THE INVENTION

1. Field of the Invention

The present invention relates to a high-pressure fuel injection pipe which is in use connected to a common rail system or a P-L-D (pump line delivery) injection system (hereinafter referred to as the P-L-D injection system) for a diesel internal combustion engine.

2. Description of the Prior Arts

This kind of diesel engine fuel injection pipe has heretofore included, for example, a truncated conical connecting head 12 which has a seat surface 13 made of an outside circumferential surface formed at the end of a thick-walled steel pipe 11 as shown in FIG. 13, or a truncated conical connecting head 22 which has a seat surface 23 made of an outside circumferential surface formed at the end of a thick-walled steel pipe 21 as shown in FIG. 14. Each of the truncated conical connecting heads 12 and 22 is formed by buckling under axial pressure which is applied from the outside by a punch member, and at the same time a circumferential wall of each of the connecting heads 12 and 22 is expanded outwardly by buckling under such axial pressure, whereby an annular pocket 15-1 (FIG. 13) or an annular notch 15-2 (FIG. 14) is formed in the inside of the connecting head 12 or 22. The diesel engine fuel injection pipe is at present in use in the above-described state. Incidentally, reference numeral 14 denotes a sleeve washer fitted to the back of the connecting head, and reference numeral 16 denotes a clamping nut.

In a fuel injection system which adopts such a diesel engine fuel injection pipe, the diesel engine fuel injection pipe is made short in order to inject a sufficient amount of fuel into a combustion chamber without causing pressure loss in the pipe as well as in terms of the convenience of piping. However, even in such a short injection pipe, when a valve is closed after the injection of fuel, pressure variations occur in the injection pipe. These pressure variations reach even a common rail through the pipe in the form of pulsations, and further affect the next cylinder. This leads to the problem that the fuel injection pipe cannot effect stable injection of fuel.

As a countermeasure against this problem, it is possible to reduce the pressure variations, as by enlarging the inner diameter of the injection pipe or the common rail to increase the volume of the pipe. However, there occurs the disadvantage that pulsations propagate fast. In order to suppress the pulsations and make the propagation thereof slow and small, the methods of forming orifices in common rails have been developed. Two methods are known as such methods. One of the methods is to make far smaller the diameter of each branch hole formed in a common rail and give orifice functions to the respective branch holes, while the other is to insert a metal ring member (piece) having an orifice into each branch hole portion of a common rail. Either method is capable of suppressing pulsations and making the propagation thereof slow. However, the method of making far smaller the respective diameters of branch holes in a common rail and giving orifice functions to the respective branch holes has the disadvantage that since repetitive high pressures are applied to the branch hole portions, a wall thickness of a minimum of 7 mm or more is needed, and also since machining must be performed at a location deep under the peripheral surface of the common rail, orifices are not easy to form. The method of inserting a metal ring member (piece) having an orifice into each branch hole portion has the disadvantage that two portions, i.e., the portion between the common rail and the metal ring member and the portion between the injection pipe and the metal ring member, are sealed by the axial force of one clamping nut incorporated in the injection pipe, but the resultant sealing is poor in stability.

SUMMARY OF THE INVENTION

The present invention has been made to solve the above-described problems, and provides a diesel engine fuel injection pipe which has an orifice pipe provided at its end portion so as to suppress pulsations, make the propagation thereof slow and small, and effect stable injection of fuel.

According to the gist of the present invention, an orifice pipe having an outer diameter smaller than or equal to the diameter of a pipe passage of the fuel injection pipe is disposed at an end of the fuel injection pipe or in the interior of the fuel injection pipe near the end thereof, on at least one side, preferably, a common-rail side in the case of a diesel engine fuel injection pipe which has a head having a conical or spherical seat surface and a clamping nut, or in the interior of the fuel injection pipe near a pump-side end thereof in the case of a P-L-D injection system.

The orifice pipe may be secured in the interior of the fuel injection pipe by an external diameter-reducing force. Otherwise, the orifice pipe may have a projecting portion one end of which projects outward from the end of the fuel injection pipe. Otherwise, the orifice pipe may have a flange portion having a diameter larger than the diameter of the pipe passage. Otherwise, the orifice pipe may be made of a hard-metal-made. pipe body and a soft-metal-made ring fitted on one end of the pipe body which projects outward from the end of the fuel injection pipe. Otherwise, the orifice pipe may be made of a hard-metal-made inner pipe and a soft-metal-made outer pipe having a flange portion which projects outward from the end of the fuel injection pipe.

In other words, according to the present invention, the orifice pipe is disposed at or inward of the end opening of the connecting head of the fuel injection pipe, and this orifice pipe serves the role of an orifice and makes it possible to suppress pulsations, make the propagation of pulsations slow and small, and effect stable injection of fuel without affecting sealing performance. In addition, since the flange portion or the ring is made of a soft metal, the axial force of the clamping nut is prevented from being cancelled and a decrease in sealing surface pressure is prevented.

In the present invention, means for fixing the orifice pipe may be press fitting, caulking, rolling, shrinkage fitting, soldering, welding or the clamping of the flange portion between the orifice pipe and a mating seat surface.

BRIEF DESCRIPTION OF THE DRAWINGS

The invention will become more readily appreciated and understood from the following detailed description of a preferred embodiment of the invention when taken in conjunction with the accompanying drawings, in which.

DETAILED DESCRIPTION OF PREFERRED EMBODIMENTS

Figure 1:
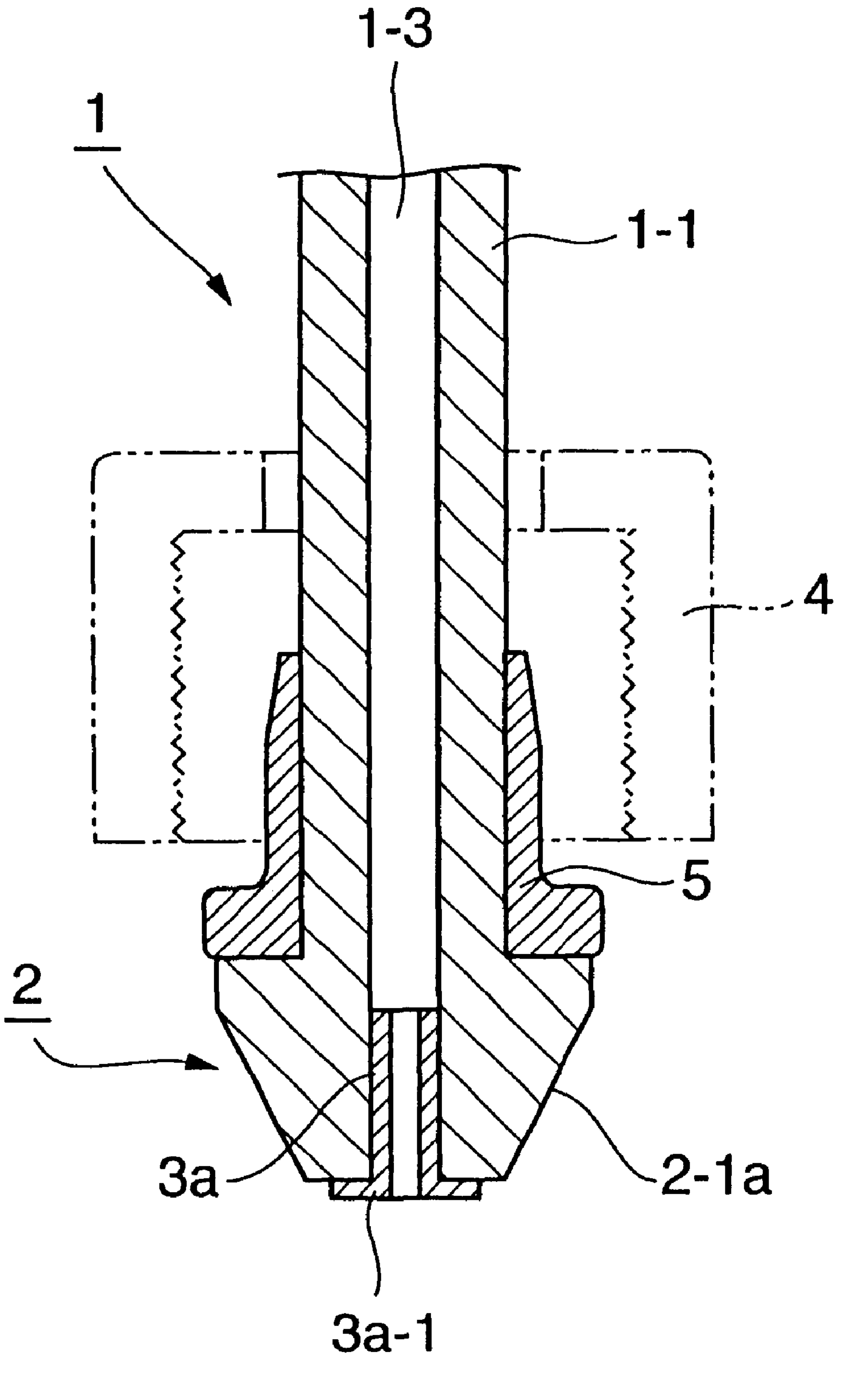
FIG. 1 is a longitudinal sectional view showing a first embodiment of the diesel engine fuel injection pipe according to the present invention.

In the present invention, reference numeral 1 denotes a fuel injection pipe, reference numeral 2 a connecting head, reference numerals 3*a*, 3*b*, 3*c*, 3*d*, 3*e*, 3*f*, and 3*g* orifice pipes, reference numeral 4 a clamping nut, reference numeral 5 a sleeve washer, reference numeral 6 a main pipe rail, and reference numeral 7 a pump body disposed in a P-L-D injection system.

The diesel engine fuel injection pipe 1 shown in FIG. 1 includes the truncated conical connecting head 2 which has a seat surface 2-1*a* made of an outside circumferential surface formed at the end of a thick-walled steel pipe 1-1, and an orifice pipe 3*a* which is fixedly fitted in the end opening of the connecting head 2 and which has a flange portion 3*a*-1 and an outer diameter approximately equal to the diameter of a pipe passage 1-3 of the thick-walled steel pipe 1-1. The flange portion 3*a*-1 of the orifice pipe 3*a* has a diameter larger than that of the pipe passage 1-3, and projects outward from the end of the thick-walled steel pipe 1-1. As described previously, means for fixing the orifice pipe 3*a* may be press fitting, caulking, rolling, shrinkage fitting, soldering, welding or other similar means, but the orifice pipe 3*a* need not necessarily be fixed. The diesel engine fuel injection pipe 1 has the clamping nut 4 and the sleeve washer 5 each fitted on the thick-walled steel pipe 1-1.

Figure 2:
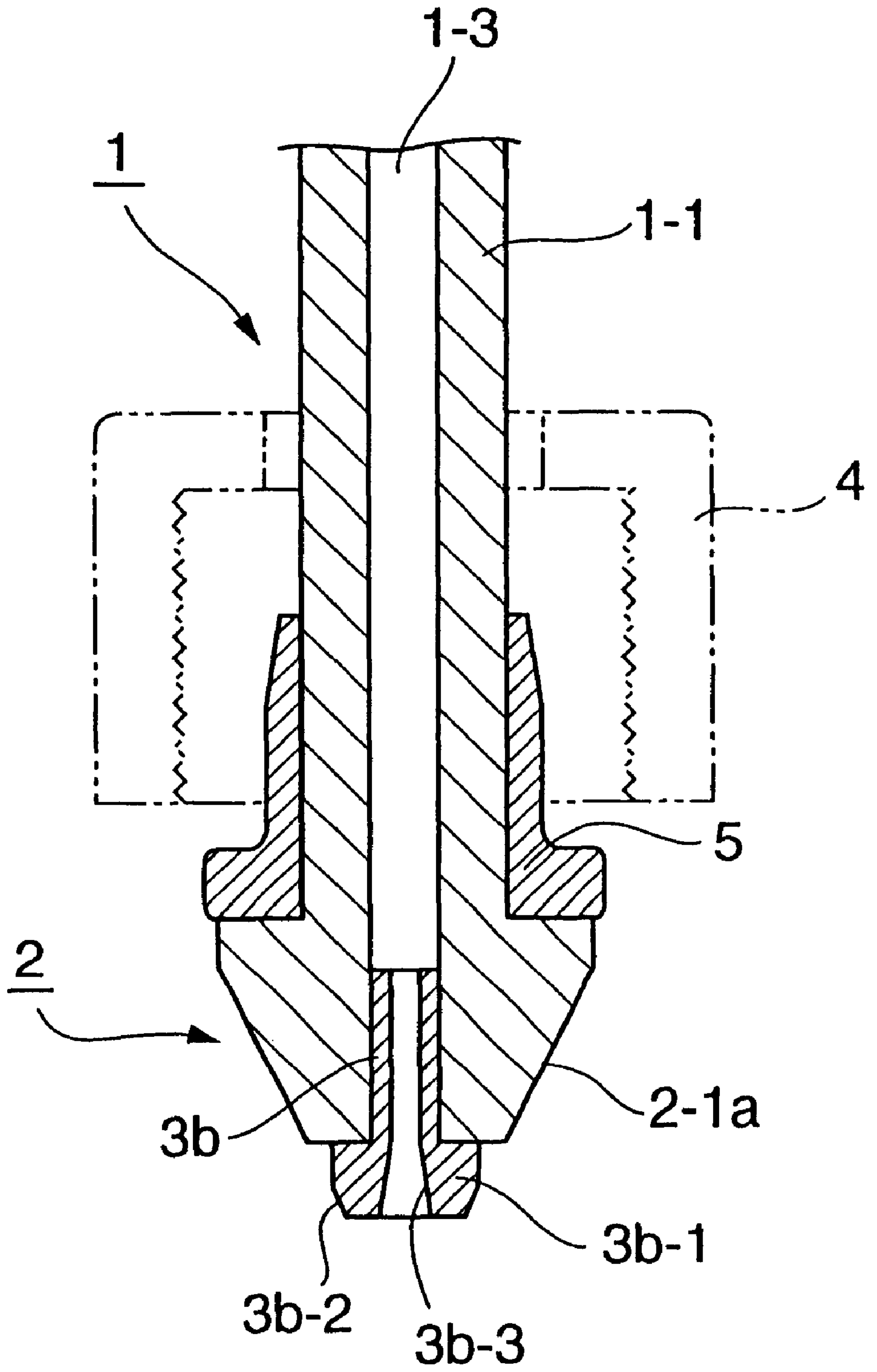
FIG. 2 is a longitudinal sectional view showing a second embodiment of the diesel engine fuel injection pipe according to the present invention.

The diesel engine fuel injection pipe 1 shown in FIG. 2 has a construction similar to that shown in FIG. 1, except for the orifice pipe 3*b*. The diesel engine fuel injection pipe 1 includes the truncated conical connecting head 2 which has the seat surface 2-1*a* made of an outside circumferential surface formed at the end of the thick-walled steel pipe 1-1, and the orifice pipe 3*b* which is fixedly fitted in the end opening of the connecting head 2 and which has a flange portion 3*b*-1 and an outer diameter approximately equal to the diameter of the pipe passage 1-3 of the thick-walled steel pipe 1-1. The flange portion 3*b*-1 of the orifice pipe 3*b* is made thick-wall so that the flange portion 3*b*-1 can be secured in contact with a mating member, and has an outer circumferential surface formed as a seat surface 3*b*-2 which constitutes the same inclined surface as the seat surface 2-1*a* of the connecting head 2. Incidentally, the end opening of the orifice pipe 3*b* may be formed as an inversely gently tapered hole 3*b*-3 which is opened outwardly as shown..

Figure 3:
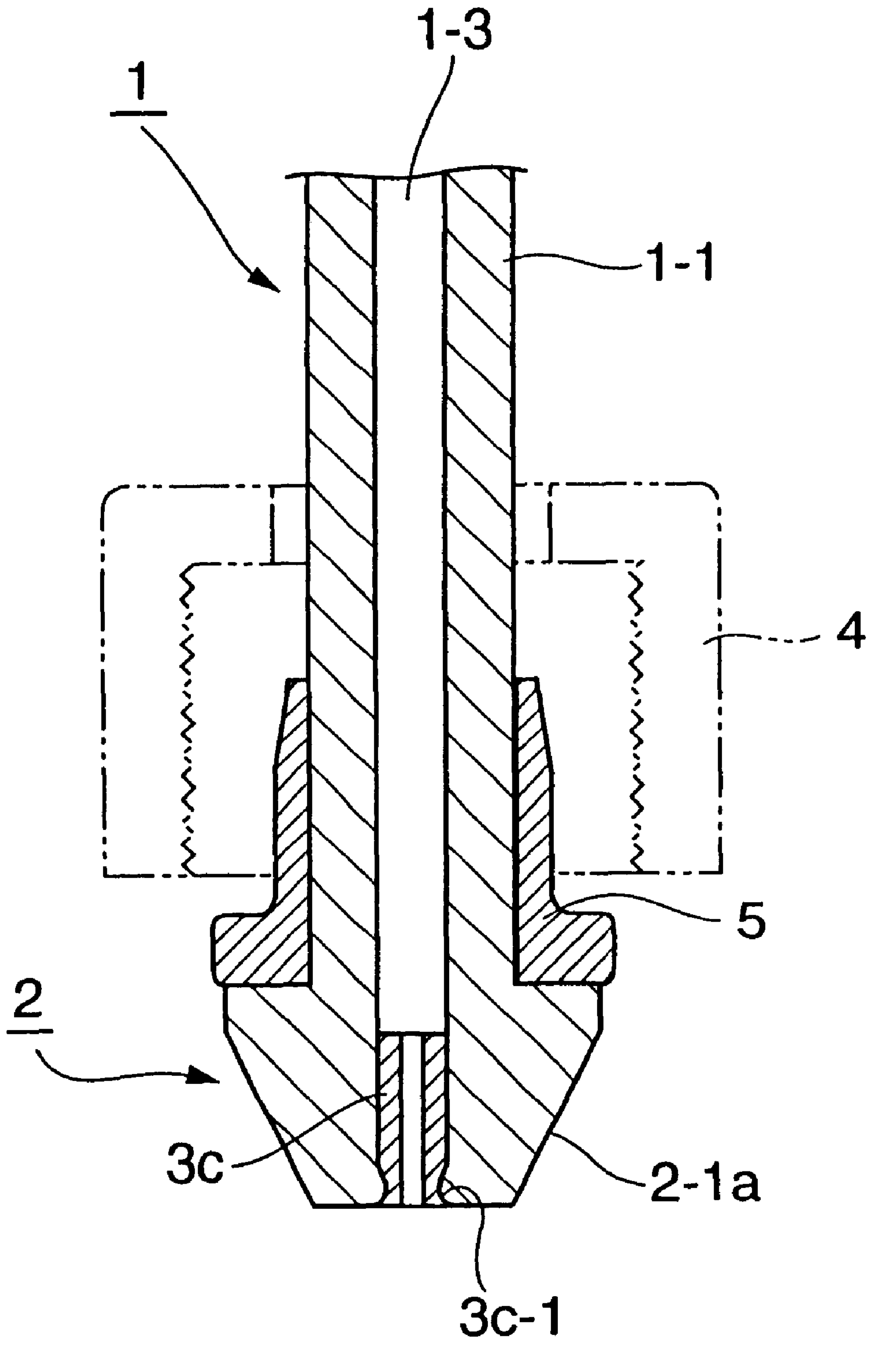
FIG. 3 is a longitudinal sectional view showing a third embodiment of the diesel engine fuel injection pipe according to the present invention, showing an example in which an orifice pipe is disposed approximately flush with the end surface of a connecting head.
Figure 4:
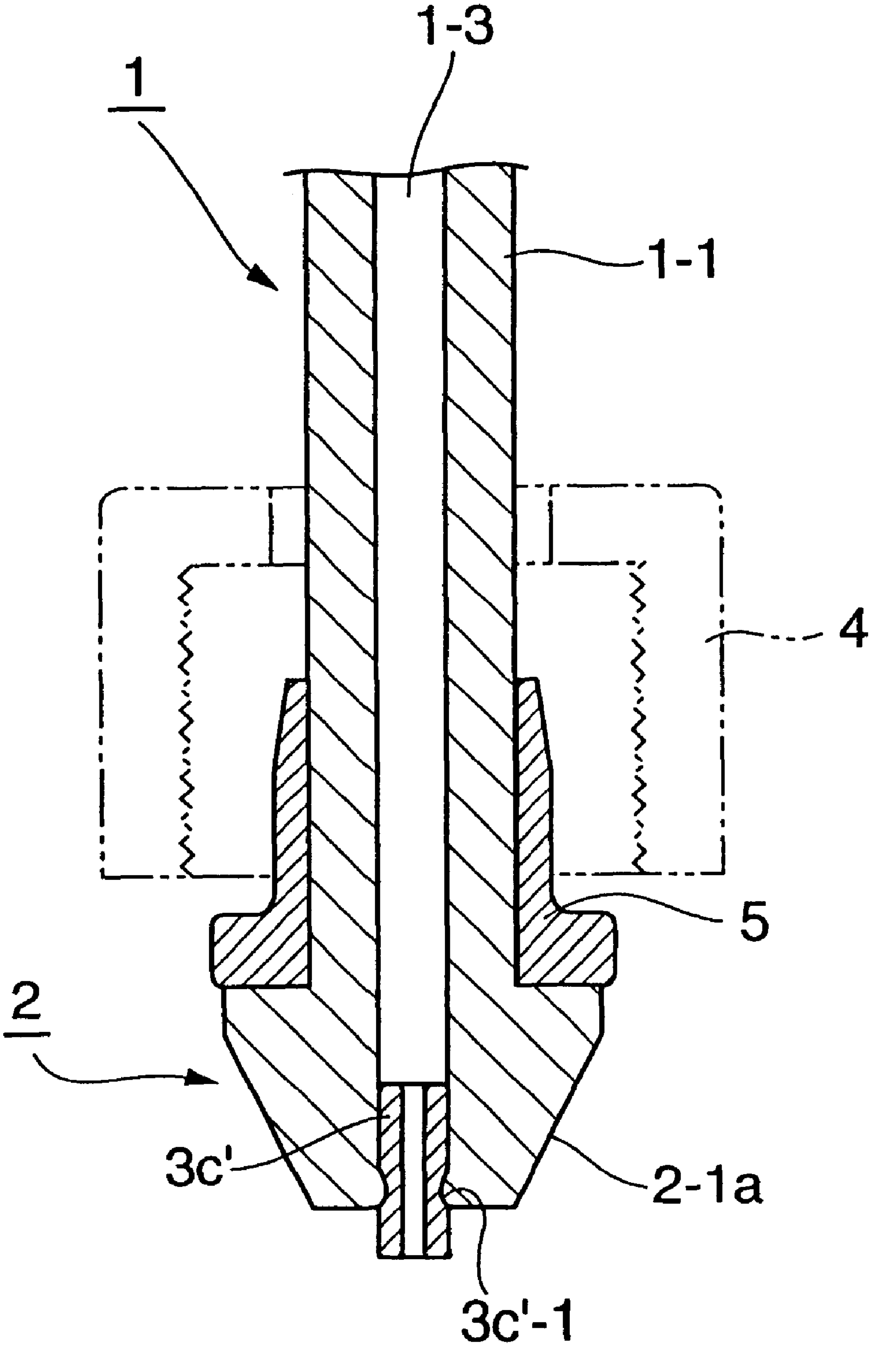
FIG. 4 is a longitudinal sectional view showing the third embodiment of the diesel engine fuel injection pipe according to the present invention, showing an example in which a portion of the orifice pipe is secured in the state of being projected from the end surface of the connecting head.
Figure 5:
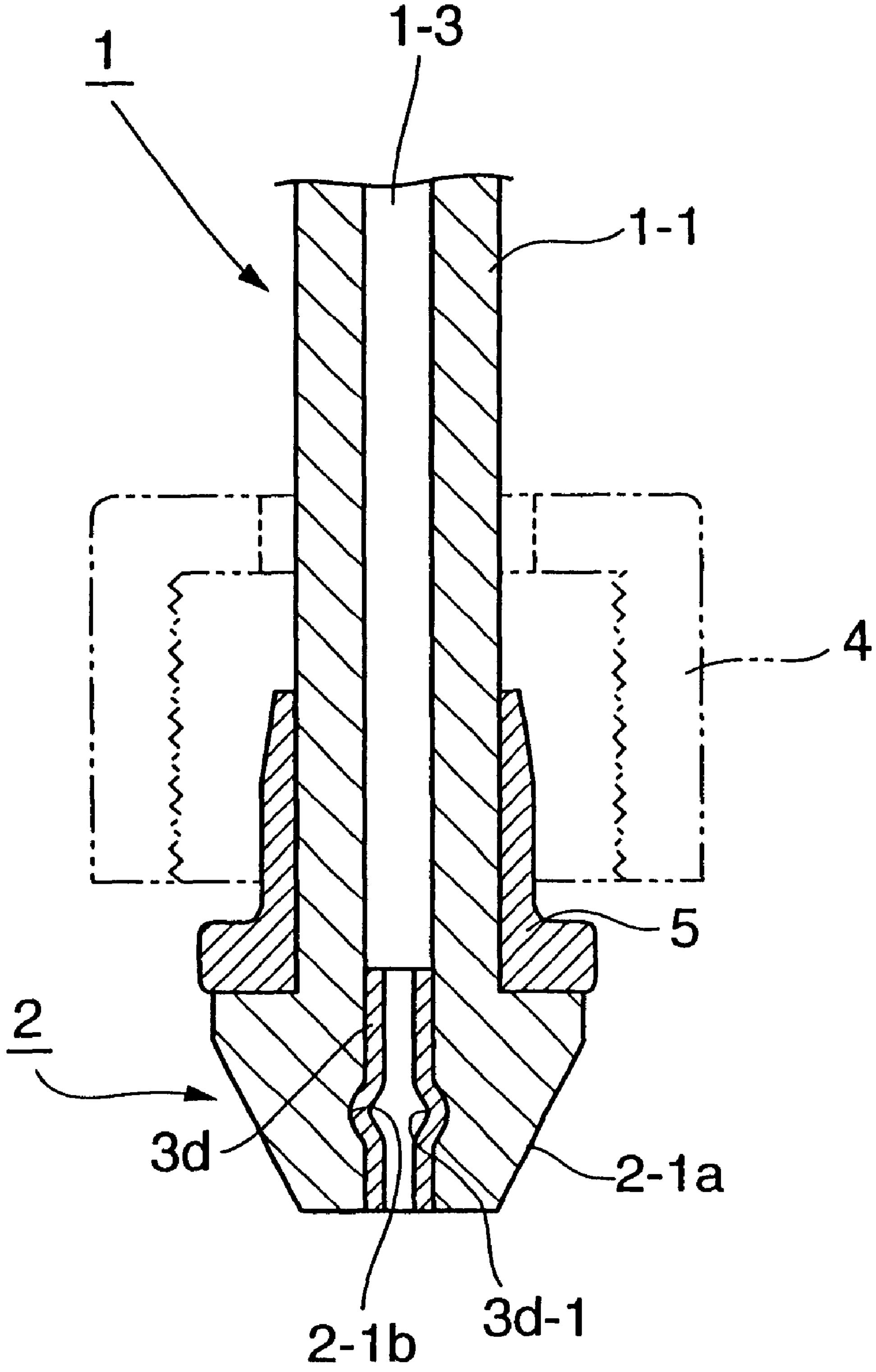
FIG. 5 is a longitudinal sectional view showing a fourth embodiment of the diesel engine fuel injection pipe according to the present invention.

The respective diesel engine fuel injection pipes 1 shown in FIGS. 3 and 4 have constructions each similar to that shown in FIG. 1, except for the orifice pipe 3*c* and an orifice pipe 3*c*. The diesel engine fuel injection pipe 1 shown in FIG. 3 includes the truncated conical connecting head 2 which has the seat surface 2-1*a* made of an outside circumferential surface formed at the end of the thick-walled steel pipe 1-1, and the orifice pipe 3*c* which is fixedly fitted in the end opening of the connecting head 2 and which has an outer diameter approximately equal to the diameter of the pipe passage 1-3 of the thick-walled steel pipe 1-1. A recess 3*c*-1 is formed in an outer circumferential portion of the end of the orifice pipe 3*c* in advance or at the same time as the connecting head 2, and during the formation of the connecting head 2, the connecting head 2 is made to plastically flow into the recess 3*c*-1 so that the orifice pipe 3*c* is secured to the connecting head 2. Specifically, the orifice pipe 3*c* is secured to the connecting head 2 with the end opening being caulked so that the end opening is approximately flush with the end surface of the connecting head 2 as shown in FIG. 3. In FIG. 4, a recess 3*c*'-1 is formed in the approximate middle of the orifice pipe 3*c*' in advance or at the same time as the connecting head 2, and during the formation of the connecting head 2, the connecting head 2 is made to plastically flow into the recess 3*c*'-1 so that the orifice pipe 3*c*, can be secured to the connecting head 2 with the end portion of the orifice pipe 3*c*' projected from the end surface of the connecting head 2.

The diesel engine fuel injection pipe 1 shown in FIG. 2 has a construction similar to that shown in FIG. 1, except for the orifice pipe 3*d*. The diesel engine fuel injection pipe 1 includes the truncated conical connecting head 2 which has the seat surface 2-1*a* made of an outside circumferential surface formed at the end of the thick-walled steel pipe 1-1, and the orifice pipe 3*d* which has an outer diameter approximately equal to the diameter of the pipe passage 1-3-of the thick-walled steel pipe 1-1 and is fixedly fitted in the end opening of the connecting head 2 by a concave-convex fitting method. The orifice pipe 3*d* is fitted in the connecting head 2 in the state where an annular concave groove 2-1*b* formed during the process of buckling the connecting head 2 under pressure is covered with an annular convex portion 3*d*-1.

Figure 6:
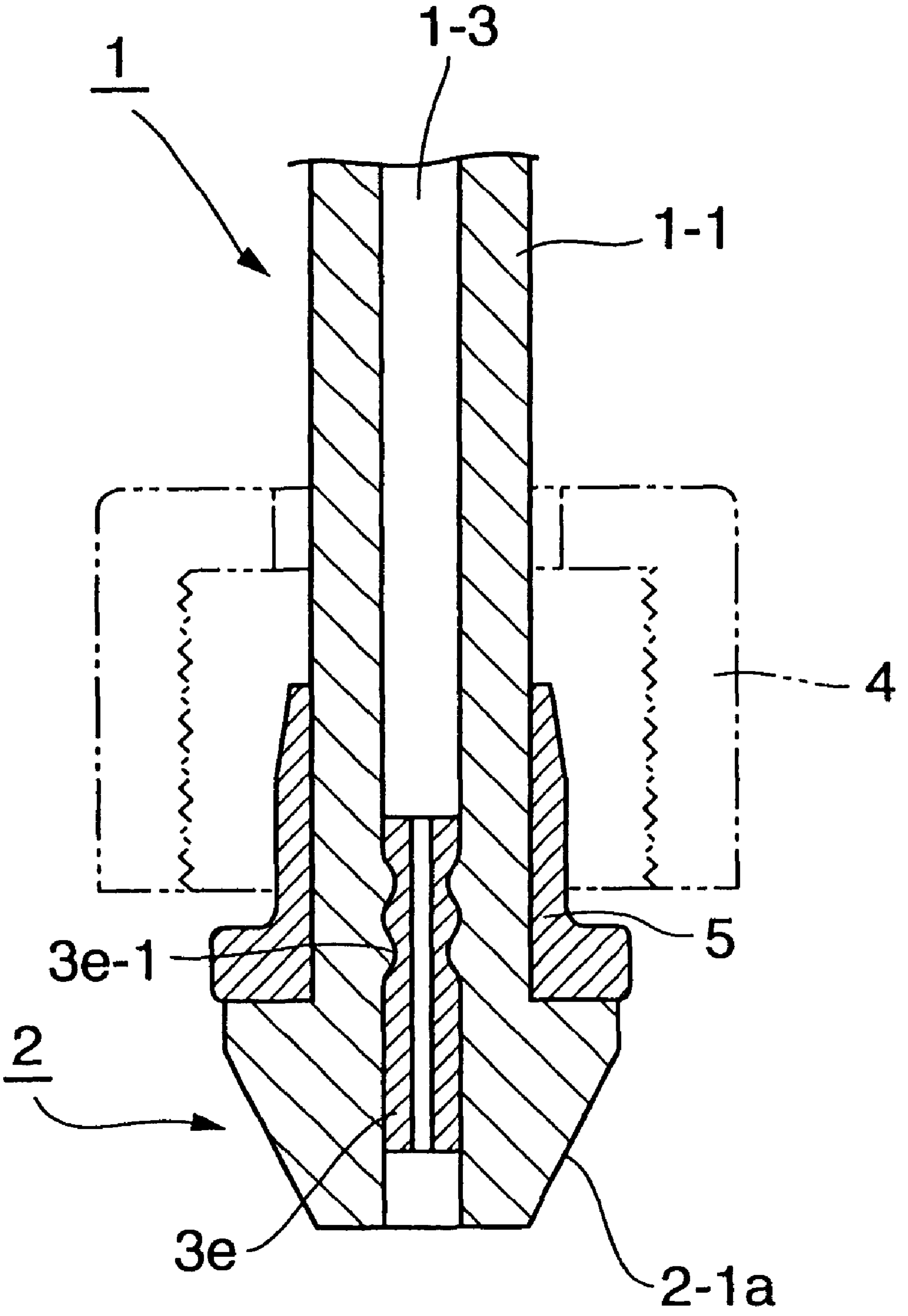
FIG. 6 is a longitudinal sectional view showing a fifth embodiment of the diesel engine fuel injection pipe according to the present invention.

The diesel engine fuel injection pipe 1 shown in FIG. 6 has a construction similar to that shown in FIG. 1, except for the orifice pipe 3*e*. The diesel engine fuel injection pipe 1 includes the truncated conical connecting head 2 which has the seat surface 2-1*a* made of an outside circumferential surface formed at the end of the thick-walled steel pipe 1-1, and the orifice pipe 3*e* which has an outer diameter approximately equal to the diameter of the pipe passage 1-3 of the thick-walled steel pipe 1-1 and is fixedly fitted in the thick-walled steel pipe 1-1 inwardly of the end opening of the connecting head 2. A reduced-diameter portion 3*e*-1 is formed in a portion of the orifice pipe 3*e* in advance, and the thick wall of the thick-walled steel pipe 1-1 is externally made to flow plastically into the reduced-diameter portion 3*e*-1 during the formation of the connecting head 2 or by caulking or rolling, so that the orifice pipe 3*e* is secured to the connecting head 2. The reason why the orifice pipe 3*e* is disposed not flush with but inward from the end opening of the connecting head 2 and is caulked upstream of the connecting head 2 is to prevent the seat surface 2-1*a* from being damaged during the formation of the connecting head 2.

Incidentally, the orifice pipe need not necessarily be secured, but may also be secured by soldering, shrinkage fitting, welding, press fitting or the like.

Figure 7:
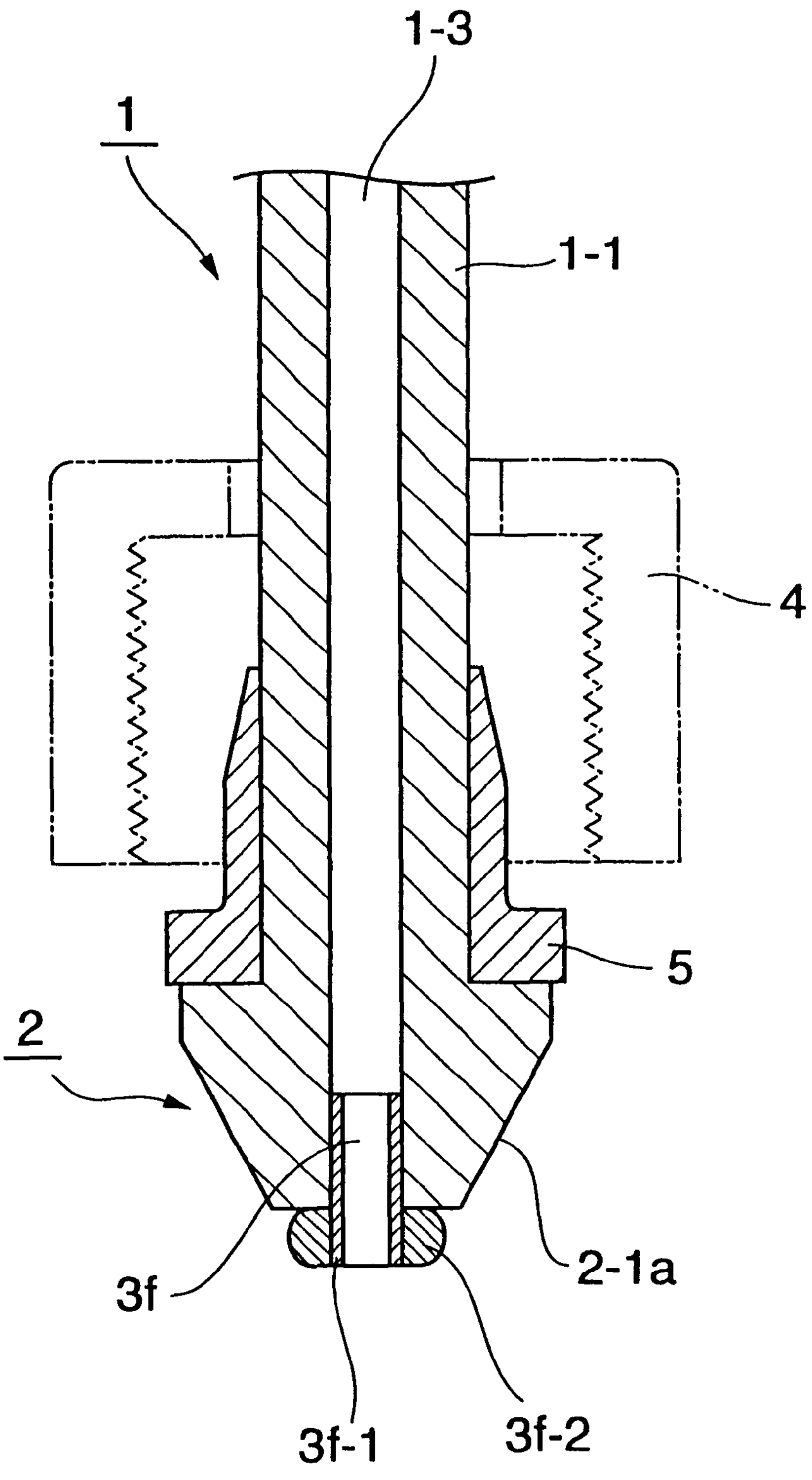
FIG. 7 is a longitudinal sectional view showing a sixth embodiment of the diesel engine fuel injection pipe according to the present invention.

The diesel engine fuel injection pipe 1 shown in FIG. 7 has a construction-similar to that shown in any of FIGS. 1 to 6, except for the orifice pipe 3*f*. The diesel engine fuel injection pipe 1 includes the truncated conical connecting head 2 which has the seat surface 2-1*a* made of an outside circumferential surface formed at the end of the thick-walled steel pipe 1-1, and the orifice pipe 3*f* fixedly fitted in the end opening of the connecting head 2. The orifice pipe 3*f* is made of a pipe body 3*f*-1 having an outer diameter approximately equal to the diameter of the pipe passage 1-3 and a soft-metal-made ring 3*f*-2 fitted on the end portion of the pipe body 3*f*-1. The soft-metal-made ring 3*f*-2 of the orifice pipe 3*f* is made thick-wall so that the ring 3*f*-2 is secured in contact with a mating member.

Figure 8:
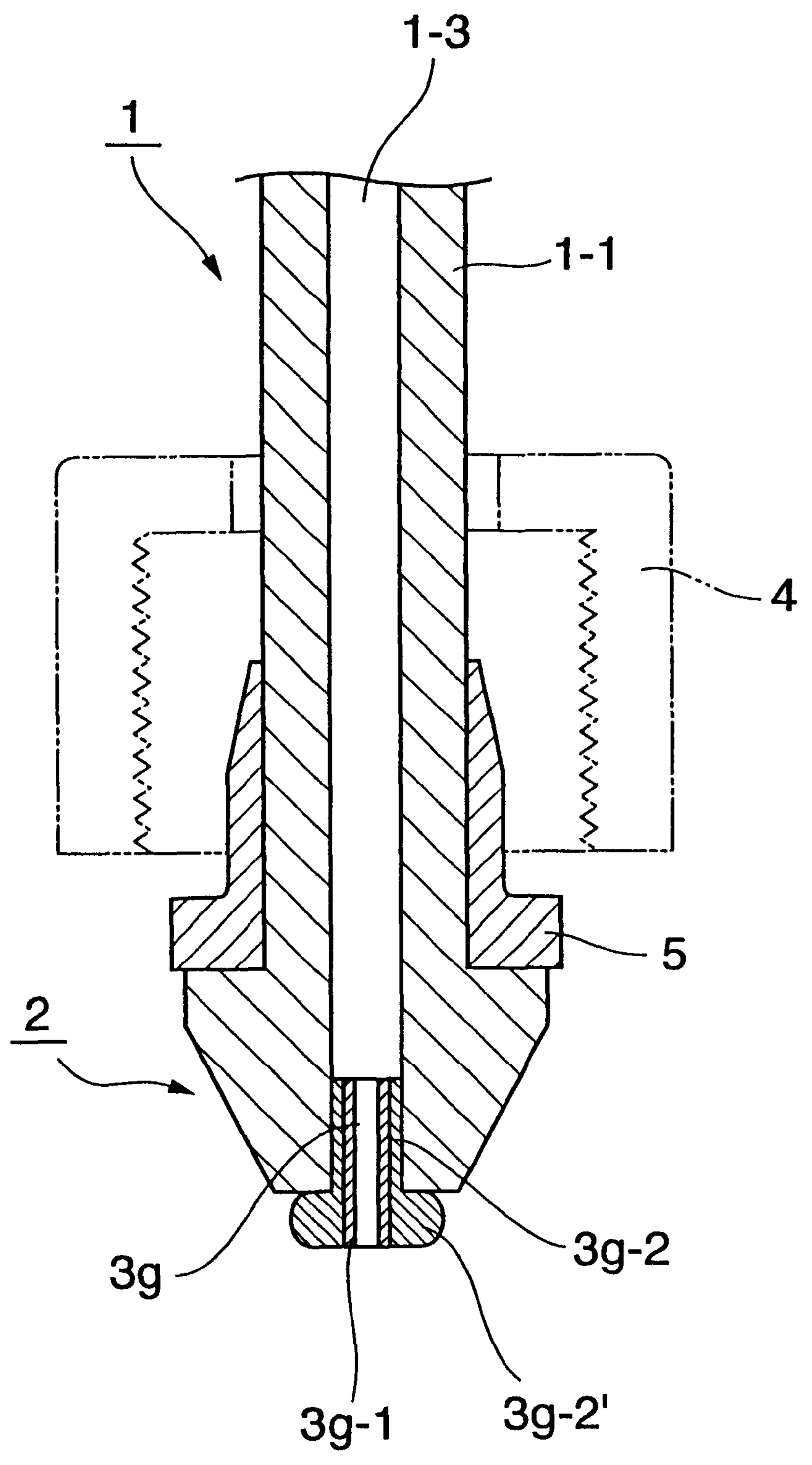
FIG. 8 is a longitudinal sectional view showing a seventh embodiment of the diesel engine fuel injection pipe according to the present invention.

The diesel engine fuel injection pipe 1 shown in FIG. 8 has a construction similar to that shown in any of FIGS. 1 to 6, except for the orifice pipe 3*g*. The diesel engine fuel injection pipe 1 includes the truncated conical connecting head 2 which has the seat surface 2-1*a* made of an outside circumferential surface formed at the end of the thick-walled steel pipe 1-1, and the orifice pipe 3*g* fixedly fitted in the end opening of the connecting head 2. The orifice pipe 3*g* is made of a soft-metal-made outer pipe 3*g*-2 which has an outer diameter approximately equal to the diameter of the pipe passage 1-3 of the thick-walled steel pipe 1-1 and has a flange portion 3*g*-2' at its end, and a soft-metal-made inner pipe 3*g*-1 having approximately the same wall thickness as the outer pipe 3*g*-2. The flange portion 3*g*-2' of the outer pipe 3*g*-2 of the orifice pipe 3*g* is made thick-wall so that the flange portion 3*g*-2' is secured in contact with a mating member.

A connection structure example in which the diesel engine fuel injection pipe 1 shown in FIG. 1 is applied to a common rail will be described below with reference to FIG. 9.

Figure 9:
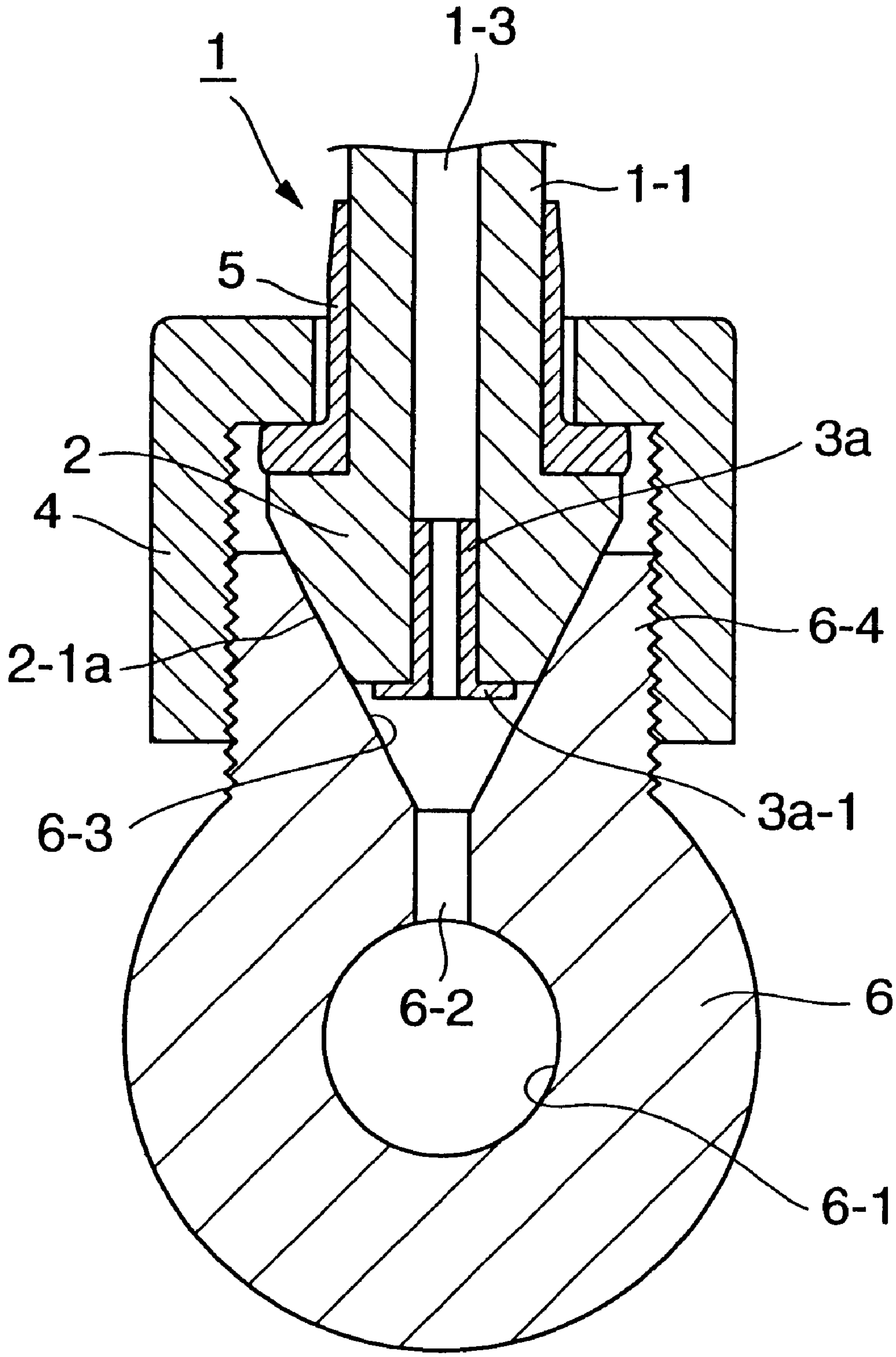
FIG. 9 is a longitudinal sectional view showing a connection structure example in which the diesel engine fuel injection pipe shown in FIG. 1 is applied to a common rail.

In the connection structure shown in FIG. 9, plural boss portions 6-4 are provided on the peripheral portion of the main pipe rail 6 made from a circular pipe, in such a manner as to be spaced part from one another in the axial direction of the main pipe rail 6, and branch holes 6-2 are formed in the respective boss portions 6-4. Each of the branch holes 6-2 communicates with a circulating passage 6-1 and has a pressure-receiving seat surface 6-3 which is opened outwardly. The seat surface (pressure-applying seat surface) 2-1*a* which is formed by the connecting head 2 of the diesel engine fuel injection pipe shown in FIG. 1 is brought into engagement with the pressure-receiving seat surface 6-3 of the main pipe rail 6, and the clamping nut 4 fitted on the fuel injection pipe 1 by means of the sleeve washer 5 is screwed onto the boss portion 6-4 so that the fuel injection pipe 1 is fastened and connected to the main pipe rail 6 by the pressure applied to the neck portion of the connecting head 2.

A connection structure example in which the diesel engine fuel injection pipe 1 shown in FIG. 2 is applied to a P-L-D injection system will be described below with reference to FIG. 10.

Figure 10:
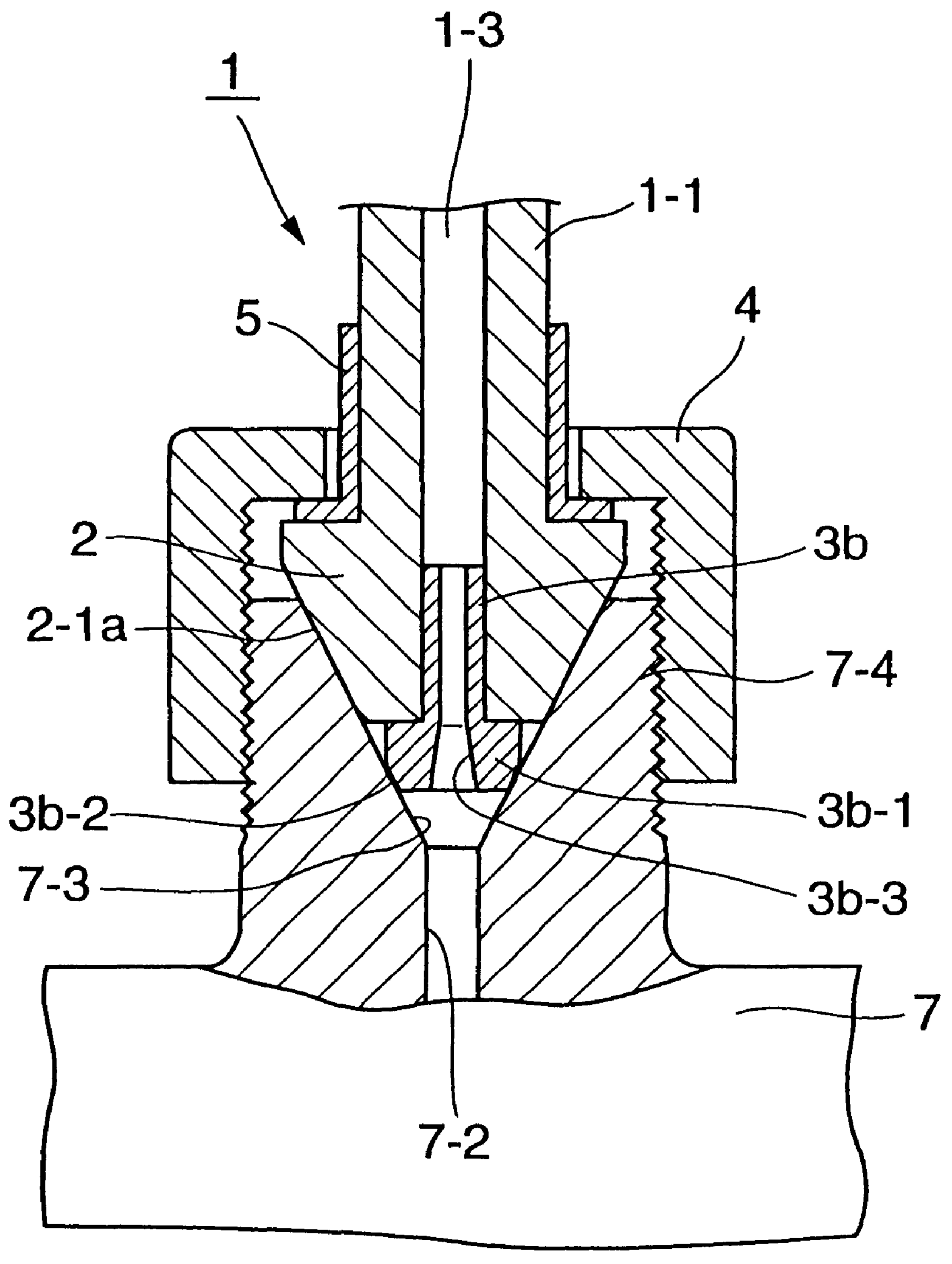
FIG. 10 is a longitudinal sectional view showing a connection structure example in which the diesel engine fuel injection pipe shown in FIG. 2 is applied to a P-L-D injection system.

In the connection structure shown in FIG. 10, branch holes 7-2, each of which communicates with the pump body 7 and has a pressure-receiving seat surface 7-3 which is opened outwardly, are respectively formed in boss portions 7-4 which are disposed on the peripheral portion of the pump body 7 in the axial direction thereof. The seat surface (pressure-applying seat surface) 2-1*a* which is formed by the connecting head 2 of the diesel engine fuel injection pipe 1 shown in FIG. 2 and the seat surface (pressure-applying seat surface) 3*b*-2 formed on the flange portion 3*b*-1 of the orifice pipe 3*b* are brought into engagement with the pressure-receiving seat surface 7-3 of the pump body 7, and the clamping nut 4 fitted on the fuel injection pipe 1 by means of the sleeve washer 5 is screwed onto the boss portion 7-4 so that the fuel injection pipe 1 is fastened and connected to the pump body 7 by the pressure applied to the neck portion of the connecting head 2.

In the case of the orifice pipe 3*b*, the seat surface 3*b*-2 to be brought into abutment with the pressure-receiving seat surface 7-3 is formed around the circumferential surface of the end portion of the seat surface 3*b*-2 so that when the fuel injection pipe 1 is connected to the pump body 7 by tightening the clamping nut 4, the end of the flange portion 3*b*-1 of the orifice pipe 3*b* is brought into engagement with the pressure-receiving seat surface 7-3 of the pump body 7. Accordingly, by tightening the clamping nut 4, the orifice pipe 3*b* is clamped between the connecting head 2 and the pressure-receiving seat surface 7-3, whereby the orifice pipe 3*b* is secured far more firmly.

A connection structure example in which the diesel engine fuel injection pipe 1 shown in FIG. 7 is applied to a common rail will be described below with reference to FIG. 11.

As in the connection structure shown in FIG. 9, plural boss portions 8-4 are provided on the peripheral portion of a main pipe rail 8 made from a circular pipe, in such a manner as to be spaced part from one another in the axial direction of the main pipe rail 8, and branch holes 8-2 are formed in the respective boss portions 8-4. Each of the branch holes 8-2 communicates with a circulating passage 8-1 of the main pipe rail 8 and has a pressure-receiving seat surface 8-3 which is opened outwardly. The seat surface (pressure-applying seat surface) 2-1*a* which is formed by the connecting head 2 of the diesel engine fuel injection pipe 1 shown in FIG. 7 is brought into engagement with the pressure-receiving seat surface 8-3 of the main pipe rail 8, and the clamping nut 4 fitted on the fuel injection pipe 1 by means of the sleeve washer 5 is screwed onto the boss portion 8-4 so that the fuel injection pipe 1 is fastened and connected to the main pipe rail 8 by the pressure applied to the neck portion of the connecting head 2.

In the case of the orifice pipe 3*f*, the circumferential surface of the end portion of the thick-walled ring 3*f*-2 is brought into abutment with the pressure-receiving seat surface 8-3 so as to form a seat surface so that when the fuel injection pipe 1 is fastened and connected to the boss portion 8-4 of the main pipe rail 8 by tightening the clamping nut 4, the end of the thick-walled ring 3*f*-2 of the orifice pipe 3*f* is brought into engagement with the pressure-receiving seat surface 8-3 of the main pipe rail 8. Accordingly, by tightening the clamping nut 4, the orifice pipe **3*f* is clamped between the connecting head 2 and the pressure-receiving seat surface 8-3, whereby not only is the orifice pipe 3*f* secured far more firmly, but also extremely good sealing performance can be achieved because the ring 3*f*-2 is made of a soft metal. In addition, since the ring 3*f*-2 is made from soft metal and the pipe body 3*f*-1 made of a hard metal, the ring 3*f*-2 can be firmly secured to the pipe passage 1-3 without being reduced in diameter during the formation of the connecting head 2**.

A connection structure example in which the diesel engine fuel injection pipe 1 shown in FIG. 8 is applied to a common rail will be described below with reference to FIG. 12.

Figure 11:
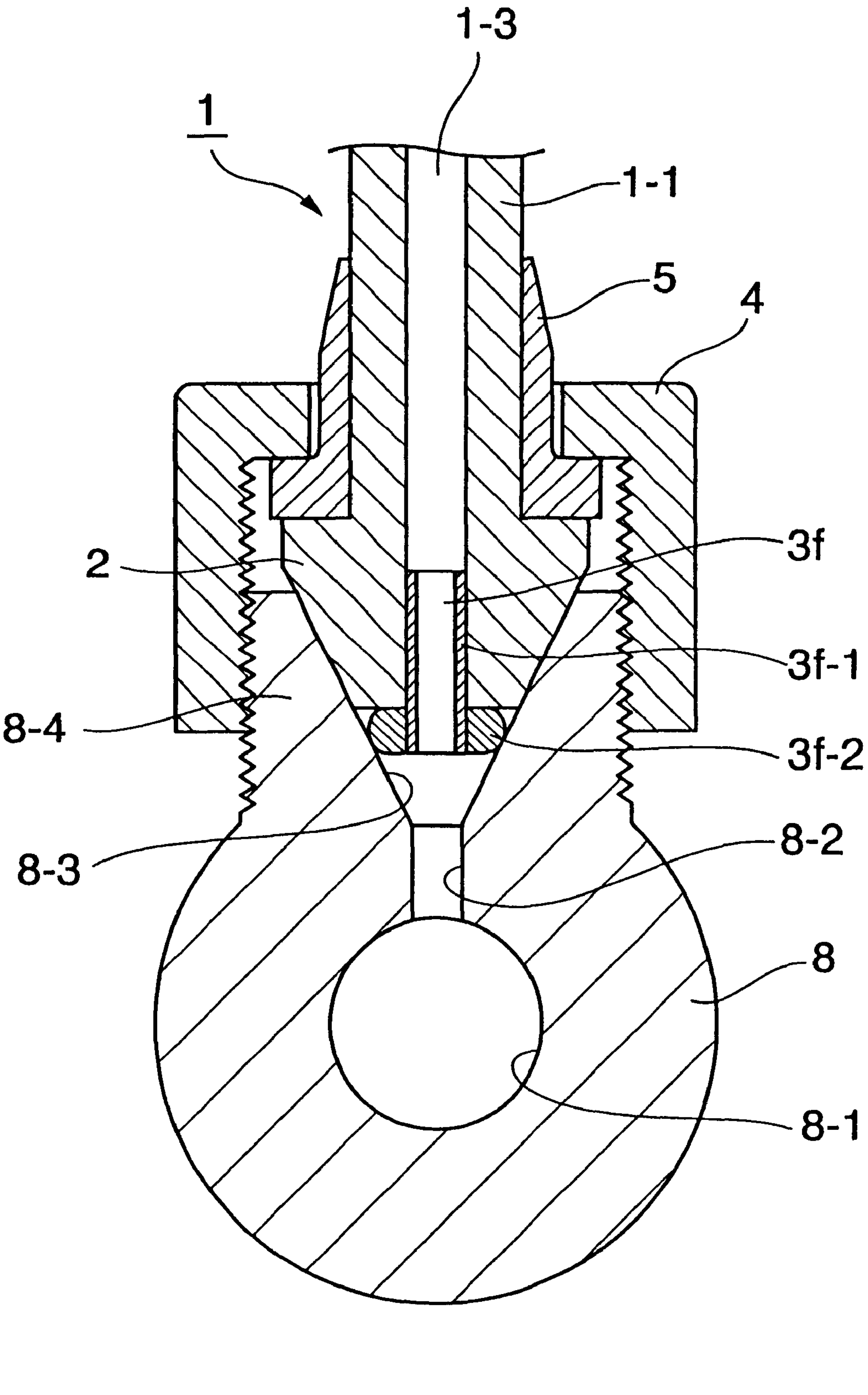
FIG. 11 is a longitudinal sectional view showing a connection structure example in which the diesel engine fuel injection pipe shown in FIG. 7 is applied to a common rail.

As in the connection structure shown in FIG. 11, plural boss portions 9-4 are provided on the peripheral portion of a main pipe rail 9 made from a circular pipe, in such a manner as to be spaced part from one another in the axial direction of the main pipe rail 9, and branch holes 9-2 are formed in the respective boss portions 9-4. Each of the branch holes 9-2 communicates with a circulating passage 9-1 of the main pipe rail 9 and has a pressure-receiving seat surface 9-3 which is opened outwardly. The seat surface (pressure-applying seat surface) **2-1*a* which is formed by the connecting head 2 of the diesel engine fuel injection pipe 1 shown in FIG. 8 is brought into engagement with the pressure-receiving seat surface 9-3 of the main pipe rail 9, and the clamping nut 4 fitted on the fuel injection pipe 1 by means of the sleeve washer 5 is screwed onto the boss portion 9-4 so that the fuel injection pipe 1 is fastened and connected to the main pipe rail 9 by the pressure applied to the neck portion of the connecting head 2**.

In the case of the orifice pipe **3*g* as well, similarly to the orifice pipe 3*f* shown in FIG. 11, the circumferential surface of the end portion of the flange portion 3*g*-2' is brought into abutment with the pressure-receiving seat surface 9-3 so as to form a seat surface so that when the fuel injection pipe 1 is fastened and connected to the boss portion 9-4 of the main pipe rail 9 by tightening the clamping nut 4, the flange portion 3*g*-2' of the thick-walled outer pipe 3*g*-2 of the orifice pipe 3*g* is brought into engagement with the pressure-receiving seat surface 9-3 of the main pipe rail 9. Accordingly, by tightening the clamping nut 4, the orifice pipe 3*g* is clamped between the connecting head 2 and the pressure-receiving seat surface 9-3, whereby not only is the orifice pipe 3*g* secured far more firmly, but also extremely good sealing performance can be achieved because the outer pipe 3*g*-2 is made of a soft metal. In addition, since the inner pipe 3*g*-1 of the orifice pipe 3*g* is made of a hard metal, the inner pipe 3*g*-1 can be firmly secured to the pipe passage 1-3**.

Figure 12:
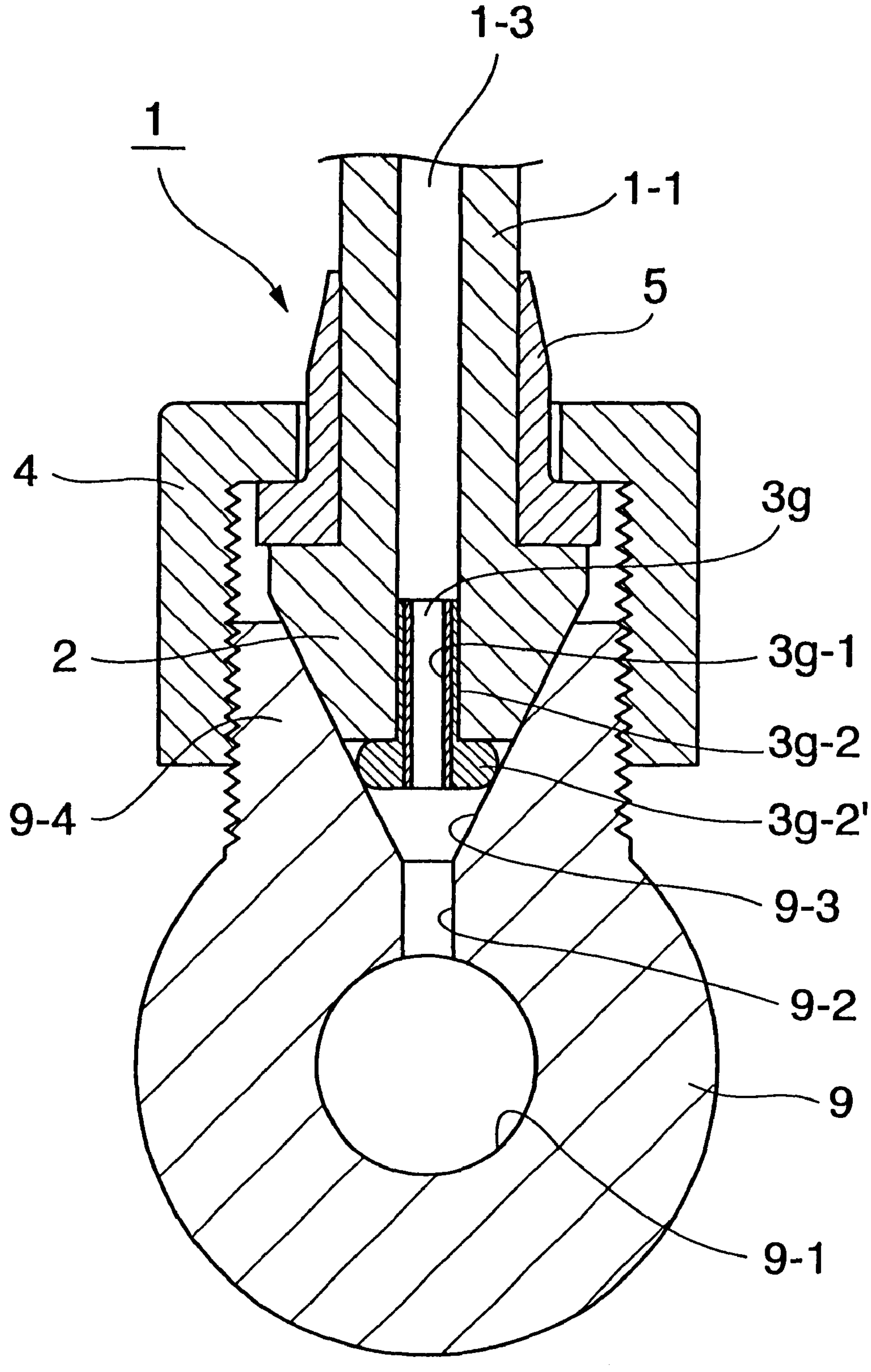
FIG. 12 is a longitudinal sectional view showing a connection structure example in which the diesel engine fuel injection pipe shown in FIG. 8 is applied to a common rail.
Figure 13:
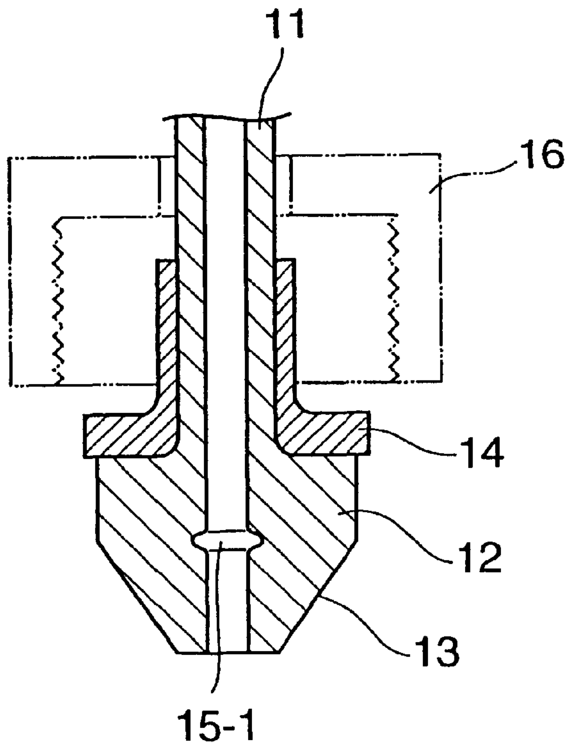
FIG. 13 is a longitudinal sectional view showing one example of a fuel injection pipe connection structure in a prior art common rail to which the present invention is to be directed.
Figure 14:
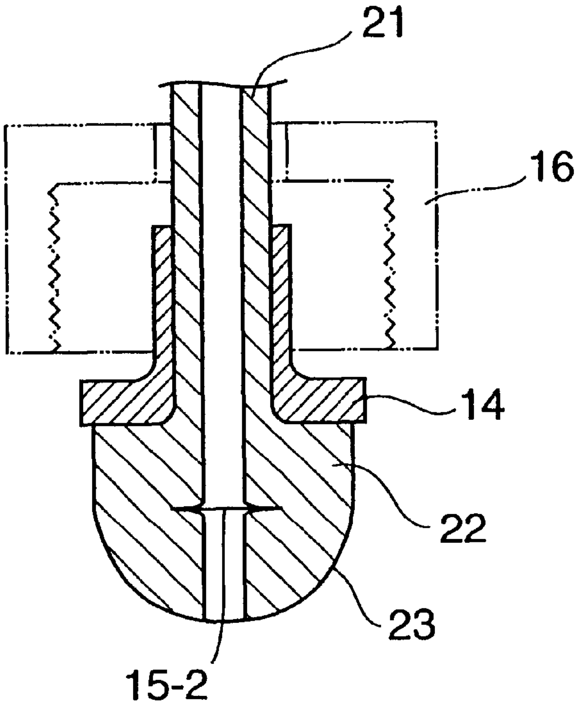
FIG. 14 is a longitudinal sectional view showing one example of pressure variation suppressing means in the fuel injection pipe connection structure in the prior art common rail.

Incidentally, each of the main body rails 6, 8, and 9 which constitute the respective common rails in the connection structure examples shown in FIGS. 9, 11, and 12 is a forging of the material S45C or the like, which has a comparatively thick-walled pipe-shaped portion of, for example, diameter 28 mm and wall thickness 9 mm, and a circulating passage is formed to extend through the forging along the axis thereof, by machining such as boring or gun drill and plural integral or separate boss portions are disposed on the peripheral portion of the forging in such a manner as to be spaced a part from one another in the axial direction thereof. In the case of a block rail type, connecting hole portions are formed in the forging. None of the common rails having integral boss portions is limited to any of the above-described connection structures, and it goes without saying that the present invention can be applied to a connection structure in which, although not shown, each branch hole which communicates with a circulating passage is formed to extend to the vicinity of the free end of the corresponding one of boss portions, and each pressure-receiving seat surface is formed to be exposed at the free end of the corresponding one of the boss portions. A female thread is formed around the inner circumference of each of the boss portions, and a nut is screwed into the female thread so that a fuel injection pipe is fastened and connected to a common rail by the pressure applied to the neck portion of the connecting head of the fuel injection pipe.

As is apparent from the foregoing description, since the diesel engine fuel injection pipe according to the present invention is constructed so that an orifice pipe is fixedly fitted in the end opening of each connecting head, this orifice pipe serves only the role of an orifice and does not affect sealing performance, whereby the diesel engine fuel injection pipe can serve the superior advantages of realizing high-stability sealing, suppressing pulsations, making the propagation of pulsations slow and small, and effecting stable fuel injection.

What is claimed is:

1. A diesel engine fuel injection pipe comprising:

a head having a conical or spherical seat surface;

a clamping nut; and an orifice pipe disposed at an end of the fuel injection pipe or in the interior of the fuel injection pipe near the end thereof, the orifice pipe having an outer diameter smaller than or equal to the diameter of a pipe passage of the diesel engine fuel injection pipe in the interior of the diesel engine fuel injection pipe near at least one end portion thereof.

2. A diesel engine fuel injection pipe according to claim 1, wherein the orifice pipe is secured in the interior of the diesel engine fuel injection pipe by an external diameter-reducing force.

3. A diesel engine fuel injection pipe according to claim 2, wherein the orifice pipe has a projecting portion one end of which projects outward from the end of the diesel engine fuel injection pipe.

4. A diesel engine fuel injection pipe according to claim 3, wherein the projecting portion has a flange portion having a diameter larger than the diameter of the pipe passage.

5. A diesel engine fuel injection pipe according to claim 2, wherein the orifice pipe is made of a hard-metal-made pipe body and a soft-metal-made ring fitted on one end of the pipe body which projects outward from the end of the diesel engine fuel injection pipe.

6. A diesel engine fuel injection pipe according to claim 2, wherein the orifice pipe is made of a hard-metal-made inner pipe and a soft-metal-made outer pipe having a flange portion which projects outward from the end of the diesel engine fuel injection pipe.

7. A diesel engine fuel injection pipe according to claim 1, wherein the orifice pipe has a projecting portion one end of which projects outward from the end of the diesel engine fuel injection pipe.

8. A diesel engine fuel injection pipe according to claim 1, wherein the orifice pipe is made of a hard-metal-made pipe body and a soft-metal-made ring fitted on one end of the pipe body which projects outward from the end of the diesel engine fuel injection pipe.

9. A diesel engine fuel injection pipe according to claim 1, wherein the orifice pipe is made of a hard-metal-made inner pipe and a soft-metal-made outer pipe having a flange portion which projects outward from the end of the diesel engine fuel injection pipe.

* * * * *